United States Patent Office 3,280,095
Patented Oct. 18, 1966

3,280,095
PROCESS FOR PRODUCING POLYETHYLENE
Willette E. Lyon, South Charleston, W. Va., assignor to Union Carbide Corporation, a corporation of New York
No Drawing. Filed Dec. 28, 1962, Ser. No. 247,800
4 Claims. (Cl. 260—94.9)

This invention relates to an improved process for producing polyethylene. More particularly, this invention relates to an improved process for producing polyethylene which comprises polymerizing ethylene under elevated conditions of temperature and pressure with an oxygen catalyst which has been activated with n-butylamine.

In British Patent 824,312 there is described a procedure whereby ethylene is polymerized under high pressure in the presence of a peroxide catalyst activated by an organic nitrogenous base wherein the nitrogen atoms are not bonded directly to hydrogen atoms. Primary and secondary amines are not disclosed as useful activators, and indeed these amines are known to be less useful for such purpose, and in some instances even inhibit the polymerization of ethylene.

It has now been discovered, in accordance with the instant invention, that when a specific primary amine, i.e. n-butylamine, is employed as a catalyst activator for oxygen in the high pressure polymerization of ethylene, the yield of polyethylene can be increased up to about 30 percent over that obtained in the absence of such activator. This discovery is indeed surprising and unexpected since increases in yield can be obtained through the use of this activator which are as good as or greater than are obtained by employing a peroxide catalyst and a tertiary amine activator, which heretofore had been preferred for such purpose.

It has been observed that the increase in yield obtained through the use of the n-butylamine activator tends to decrease as reaction conditions are varied so as to produce a polymer having a melt index of greater than 1 decigram per minute. However, regardless of the melt index of the polymer, it is characterized by improved physical properties. When such polymer is cast into a film, the film is characterized by fewer "fisheyes" than films produced from polyethylene prepared in the absence of such activator. The improved appearance of this film makes it especially suitable for use as a packaging material.

In accordance with the instant invention, n-butylamine is employed as a catalyst activator for oxygen in the high pressure polymerization of ethylene. Ethylene is contacted with the catalyst and activator at a pressure of from about 5000 p.s.i. to about 100,000 p.s.i., preferably from about 15,000 p.s.i. to about 40,000 p.s.i., and at a temperature of from about 150° C. to about 250° C., preferably from about 175° C. to about 225° C. As a result of such procedure there is obtained improved yields of polyethylene having the improved physical properties specified above.

The n-butylamine activator and oxygen catalyst can be employed together in ratios varying over rather broad ranges. In general, molar ratios of n-butylamine to oxygen of from about 0.01:1 to about 100:1 can be advantageously employed. Preferably, for efficiency and economy of operation, the ratio is maintained between 0.02:1 and 10:1.

The concentration of catalyst employed in polymerizing ethylene can vary over a wide range. In general, an amount of oxygen of from about 10 p.p.m. to about 250 p.p.m., preferably from about 50 p.p.m. to about 200 p.p.m., based upon the total amount of ethylene employed is suitable. When it is desired to produce polyethylene having a melt index of less than 1 decigram per minute, an amount of oxygen of from about 10 p.p.m. to about 150 p.p.m., preferably from about 25 p.p.m. to about 125 p.p.m., based on the total amount of ethylene employed, should be used. If an oxygen-containing gas is employed, it should be employed in an amount sufficient to provide the concentration of oxygen specified.

The n-butylamine activator can be employed in an inert liquid solvent if desired. By an inert liquid solvent is meant a liquid solvent which is essentially nonreactive under the conditions of the reaction. However, such solvents may also function as chain transfer agents. Suitable inert liquid solvents which can be employed include saturated aliphatic hydrocarbons such as hexane, heptane, isooctane, and the like; saturated cycloaliphatic hydrocarbons such as cyclohexane, methylcyclohexane, and the like; and aromatic hydrocarbons such as benzene, and the like.

The process of the instant invention is preferably conducted continuously in a tubular reactor, but can also be conducted in a semi-continuous or batchwise manner by procedures well known in the art.

The following examples are set forth for purposes of illustration so that those skilled in the art may better understand this invention, and it should be understood that they are not to be construed as limiting this invention in any manner. Unless otherwise specified, all parts and percentages, as used in the examples, are by weight. Melt index was determined in accordance with ASTM test procedure D-1238-52T and density was determined in accordance with ASTM test procedure D-1505-57T. Fisheye content was determined by comparison with a set of standard films having ratings from —50 (poorest) to +50 or higher (best). A 0 rating is considered average.

Example I

Ethylene was intermixed with sufficient air to produce a mixture containing 62 parts per million of oxygen based on the weight of ethylene. The mixture was compressed and passed through a jacketed tubular reactor about 60 feet long and 3/16 of an inch in inside diameter, at a rate of about 28 pounds per hour, while the jacket temperature was maintained at 185° C. and the reactor pressure was maintained at about 30,000 p.s.i.

Polyethylene and unconverted gas were discharged from the reactor through a suitable pressure control valve. The polymer was cooled and recovered by filtration. The conversion was about 15.9 percent. The polyethylene had a melt index of 0.19 decigram per minute and a density of 0.9205 gram/cc.

Example II

Ethylene was intermixed with sufficient air and a solution of n-butylamine in isooctane to produce a mixture containing 57 parts per million of oxygen and 37 parts per million of n-butylamine based on the weight of ethylene. The n-butylamine solution had a concentration of n-butylamine of 0.16 percent by weight and was employed in an amount sufficient to provide a molar ratio of n-butylamine to oxygen of 0.14:1. The mixture was compressed and passed through the reactor described in Example I under the same conditions except that the jacket temperature was maintained at 190° C.

The polymerized ethylene was recovered in the same manner in Example I. The conversion was about 19.9 percent, an increase of 25.2 percent over that obtained in Example I. The polyethylene had a melt index of 0.15 decigram per minute and a density of 0.9218 gram/cc.

Example III

The procedure of Example I was repeated except that the jacket temperature was maintained at 186° C. and sufficient air was employed to provide a concentration of 117 parts per million of oxygen based on the weight of ethylene. The polyethylene produced had a melt index of 3.12 decigrams per minute and a density of 0.9163 gram/cc. The visual fisheye content of a film produced from this polymer was 0.

*Example IV*

The procedure of Example III was repeated except that the jacket temperature was maintained at 190° C., and a solution of 0.18 percent by weight of n-butylamine in iso-octane was also fed through the reactor at a rate sufficient to provide a molar ratio of n-butylamine to oxygen of 0.12:1. The polyethylene produced had a melt index of 3.90 decigrams per minute and a density of 0.9175 gram/cc. The visual fisheye content of a film from this polymer was +30.

What is claimed is:

1. A process for producing polyethylene which comprises polymerizing ethylene at a temperature of from about 150° C. to about 250° C. and at a pressure of from about 5000 p.s.i. to about 100,000 p.s.i. with oxygen which has been activated with n-butylamine, the molar ratio of n-butylamine to oxygen being from about 0.01:1 to about 100:1, and the oxygen being employed in an amount of from 10 p.p.m. to about 250 p.p.m., based upon the total amount of ethylene employed.

2. A process for producing polyethylene which comprises polymerizing ethylene at a temperature of from about 175° C. to about 225° C. and at a pressure of from about 15,000 p.s.i. to about 40,000 p.s.i. with oxygen which has been activated with n-butylamine, the molar ratio of n-butylamine to oxygen being from about 0.02:1 to about 10:1, and the oxygen being employed in an amount of from about 50 p.p.m. to about 200 p.p.m., based upon the total amount of ethylene employed.

3. A process for producing polyethylene which comprises polymerizing ethylene at a temperature of from about 150° C. to about 250° C. and at a pressure of from about 5,000 p.s.i. to about 100,000 p.s.i. with oxygen which has been activated with n-butylamine, the molar ratio of n-butylamine to oxygen being from about 0.01:1 to about 100:1, and the oxygen being employed in an amount of from about 10 p.p.m. to about 150 p.p.m., based upon the total amount of ethylene employed.

4. A process for producing polyethylene which comprises polymerizing ethylene at a temperature of from about 175° C. to about 225° C. and at a pressure of from about 15,000 p.s.i. to about 40,000 p.s.i. with oxygen which has been activated with n-butylamine, the molar ratio of n-butylamine to oxygen being from about 0.02:1 to about 10:1, and the oxygen being employed in an amount of from about 25 p.p.m. to about 125 p.p.m., based upon the total amount of ethylene employed.

References Cited by the Examiner

UNITED STATES PATENTS

| 2,932,633 | 4/1960 | Juveland | 260—94.9 |
| 2,979,496 | 4/1961 | Ehrlich et al. | 260—94.9 |
| 3,072,608 | 1/1963 | Byler | 260—94.9 |

FOREIGN PATENTS 824,312  11/1959  Great Britain.

OTHER REFERENCES

Raff et al.: Polyethylene, vol. XI of High Polymers, Interscience Publishers, Inc., New York (1956) (page 61 relied on).

JOSEPH L. SCHOFER, *Primary Examiner.*

JOSEPH R. LIBERMAN, *Examiner.*

M. B. KURTZMAN, *Assistant Examiner.*